United States Patent
Ceroll et al.

(10) Patent No.: US 9,731,362 B2
(45) Date of Patent: Aug. 15, 2017

(54) TABLE SAW

(71) Applicant: Black & Decker Inc., Newark, DE (US)

(72) Inventors: Warren A. Ceroll, Owings Mills, MD (US); James D. Schroeder, Dallastown, PA (US); Peter Chaikowsky, Forest Hill, MD (US); Floyd E. Moreland, York, PA (US); Ross A. Billings, Reisterstown, MD (US); Christian V. Elder, Baltimore, MD (US); Jeremy D. Leasure, Jackson, TN (US)

(73) Assignee: Black & Decker Inc., New Britain, CT (US)

( * ) Notice: Subject to any disclaimer, the term of this patent is extended or adjusted under 35 U.S.C. 154(b) by 240 days.

(21) Appl. No.: 14/319,386

(22) Filed: Jun. 30, 2014

(65) Prior Publication Data
US 2015/0107429 A1   Apr. 23, 2015

Related U.S. Application Data

(60) Provisional application No. 61/865,763, filed on Aug. 14, 2013.

(51) Int. Cl.
*B23D 45/06* (2006.01)
*B23D 47/02* (2006.01)
(Continued)

(52) U.S. Cl.
CPC .......... *B23D 45/06* (2013.01); *B23D 47/025* (2013.01); *B23Q 3/005* (2013.01); *B27B 27/10* (2013.01);
(Continued)

(58) Field of Classification Search
CPC ...... B23D 45/06; B23D 47/025; B23Q 3/005; B27B 27/10; Y10T 83/7647; Y10T 83/7684
(Continued)

(56) References Cited

U.S. PATENT DOCUMENTS 5,115,847 A * 5/1992 Taber ................... B23D 47/025
                                                                108/69
5,722,308 A * 3/1998 Ceroll .................... B23Q 3/007
                                                                144/253.1
(Continued)

FOREIGN PATENT DOCUMENTS

WO       2012009203 A1    1/2012

OTHER PUBLICATIONS

Mark Rijks, European Search Report, dated Dec. 15, 2014, The Hague.
(Continued)

*Primary Examiner* — Ghassem Alie
*Assistant Examiner* — Nhat Chieu Do
(74) *Attorney, Agent, or Firm* — Adan Ayala, Esq.

(57) ABSTRACT

A table saw has a base assembly, a table assembly supported by the base assembly, the table assembly, and a saw assembly supported by at least one of the table assembly and the base assembly. The saw assembly has a saw blade extending through the table assembly. The base assembly has at least one foot having a substantially horizontal surface, a substantially vertical surface, and a curved surface disposed between the substantially horizontal surface and the substantially vertical surface. The substantially vertical surface is substantially coplanar with a surface of the table assembly so that the table saw can be disposed on the substantially vertical surface and the surface of the table assembly.

4 Claims, 6 Drawing Sheets

(51) Int. Cl.
*B27B 27/10* (2006.01)
*B23Q 3/00* (2006.01)

(52) U.S. Cl.
CPC ........ *Y10T 83/7647* (2015.04); *Y10T 83/7684* (2015.04)

(58) Field of Classification Search
USPC ........................................ 83/477, 477.2, 446
See application file for complete search history.

(56) References Cited

U.S. PATENT DOCUMENTS

| | | | | |
|---|---|---|---|---|
| 5,845,555 A | 12/1998 | Dawley | | |
| 5,875,698 A * | 3/1999 | Ceroll | ................. | B23D 45/062 |
| | | | | 144/286.5 |
| 6,009,782 A * | 1/2000 | Tajima | ................. | B23D 59/006 |
| | | | | 83/471.3 |
| 6,450,077 B1 | 9/2002 | Ceroll et al. | | |
| 6,644,157 B2 * | 11/2003 | Huang | ................. | B23D 47/025 |
| | | | | 144/287 |
| 6,907,807 B2 * | 6/2005 | Parks | ................. | B23D 45/067 |
| | | | | 83/473 |
| 6,986,370 B1 * | 1/2006 | Schoene | ............. | B23D 45/062 |
| | | | | 108/102 |
| 7,156,008 B2 * | 1/2007 | Talesky | ................. | B23D 47/04 |
| | | | | 83/468.2 |
| 7,191,692 B2 * | 3/2007 | Huang | ................. | B23D 47/025 |
| | | | | 144/287 |
| D626,158 S * | 10/2010 | Jebb | ............................ | D15/133 |
| 8,424,434 B2 * | 4/2013 | Koegel | ................. | B27B 5/243 |
| | | | | 83/471 |
| 2002/0050201 A1 * | 5/2002 | Lane | ................. | B23D 47/025 |
| | | | | 83/477.2 |
| 2007/0245869 A1 * | 10/2007 | Welsh | ................. | B23D 47/025 |
| | | | | 83/438 |
| 2009/0165624 A1 * | 7/2009 | Brown | ................. | B23D 47/025 |
| | | | | 83/477 |
| 2011/0197733 A1 * | 8/2011 | Liu | ................. | B27B 27/02 |
| | | | | 83/444 |
| 2012/0006167 A1 * | 1/2012 | Liu | ................. | B23D 47/025 |
| | | | | 83/444 |
| 2012/0006170 A1 * | 1/2012 | Frolov | ................. | B23D 47/02 |
| | | | | 83/477.1 |
| 2013/0133496 A1 * | 5/2013 | Frolov | ................. | B23D 47/02 |
| | | | | 83/477 |

OTHER PUBLICATIONS

Annex to the European Search Report on European Patent Application No. EP 14 17 8187.

* cited by examiner

TABLE SAW

CROSS-REFERENCE TO RELATED APPLICATION

This application derives priority from U.S. Patent Application No. 61/865,763, filed on Aug. 14, 2013, which is hereby incorporated in whole by reference.

FIELD

This invention relates generally to a table saw and more specifically to construction techniques for manufacturing table saws.

BACKGROUND

Typical portable table saws have a table, a base supporting the table, a saw assembly attached to the table and/or the base. The base is typically made of metal or plastic. Bases made of metal are typically heavy and relatively flexible, as they consist mostly of metal paneling. Bases made of plastic on the other hand could break when the table saw is dropped.

SUMMARY

In accordance with the present invention, an improved table saw is employed. The table saw has a base assembly, a table assembly supported by the base assembly, a saw assembly supported by at least one of the table assembly and the base assembly, the saw assembly including a saw blade extending through the table assembly, wherein the base assembly comprises at least one foot having a substantially horizontal surface, a substantially vertical surface, and a curved surface disposed between the substantially horizontal surface and the substantially vertical surface, wherein the substantially vertical surface is substantially coplanar with a surface of the table assembly so that the table saw can be disposed on the substantially vertical surface and the surface of the table assembly.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which.

DETAILED DESCRIPTION

Figure 1:
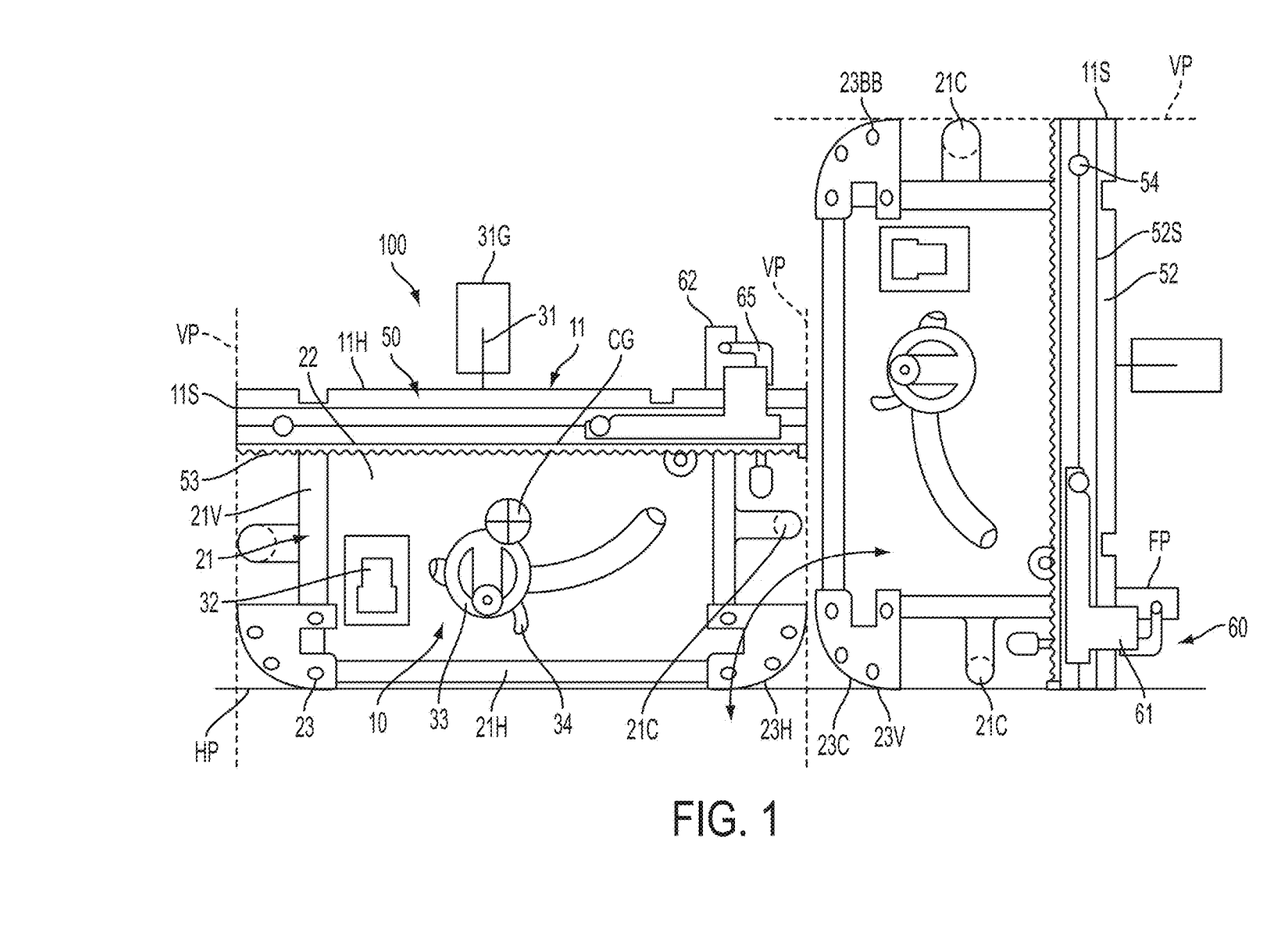
FIG. 1 illustrates a table saw according to the invention.

The invention is now described with reference to the accompanying figures, wherein like numerals designate like parts. Referring to FIG. 1, a table saw 100 may include a base assembly 10, a table assembly 11 supported by base assembly 10, and a saw assembly (not shown) supported by the table assembly 11. Persons skilled in the art will recognize that the construction of the saw assembly is well known and can be found in U.S. Pat. Nos. 5,875,698, 6,009,782, 6,450,077 and 6,907,807, all of which are hereby incorporated by reference.

The saw assembly may include a blade 31, extending through table assembly 11. A blade guard 31G may surround a portion of blade 31.

Base assembly 10 may include at least one tube 21 attached to table assembly 11. Tube 21 may be made of a composite material, such as carbon fiber or fiber glass, extruded metal, such as aluminum, steel tubing or molded plastic. Persons skilled in the art will recognize plastic tubing may be molded via gas-assist, injection molded, etc. Persons skilled in the art are referred to US Patent Publication No. 2007/0245869, which is hereby incorporated by reference for further details on such arrangement.

Preferably, base assembly 10 has two substantially U-shaped tubes 21 connected to table assembly 11. Each U-shaped tube 21 preferably has two substantially vertical tubes 21V and a substantially horizontal tube 21H. Tubes 21V, 21H may be welded to each other or formed integrally. Tubes 21 may be bolted directly unto table assembly 11 as disclosed in US Patent Publication No. 2007/0245869.

A carrying handle 21C may be attached to tubes 21V or table assembly 11. Preferably carrying handle 21C is a tube welded to tubes 21V and having a grip portion, preferably made of rubber.

Figure 2:
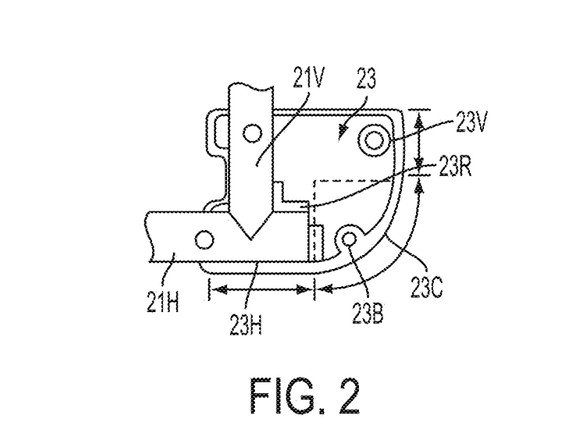
FIG. 2 is an inside view of a foot assembly.

Tubes 21 may have adjustable feet assemblies 23. Referring to FIGS. 1-2, foot assembly 23 is preferably made of plastic with overmolded rubber, or another high friction material. Preferably, foot assembly 23 is made of two halves sandwiching tubes 21V, 21H. Bolts 23BB may extend bosses 23B in both halves of foot assembly 23, and through tubes 21V, 21H to fix tubes 21V, 21H to foot assembly 23.

Each foot assembly 23 preferably has a substantially horizontal bottom surface 23H, a substantially vertical outer surface 23V and a curved surface 23C disposed between surfaces 23H, 23V. Persons skilled in the art will recognize that curved surface 23C is preferably connected to surfaces 23H, 23V. Bottom surfaces 23H preferably define a substantially horizontal plane HP. It is desirable that the center of gravity CG is disposed between the foot assemblies 23.

Table assembly 11 has a horizontal surface 11H for supporting a workpiece (not shown) and an outer surface 11S adjacent to horizontal surface 11H. Persons skilled in the art will recognize that outer surface 11S is the outermost sideward surface on table assembly 11 and that nothing in table assembly 11 will extend beyond outer surface 11S. Preferably outer surface 11S and vertical surface 23V define a substantially vertical plane VP, which may be substantially perpendicular to horizontal plane HP.

Figure 3:
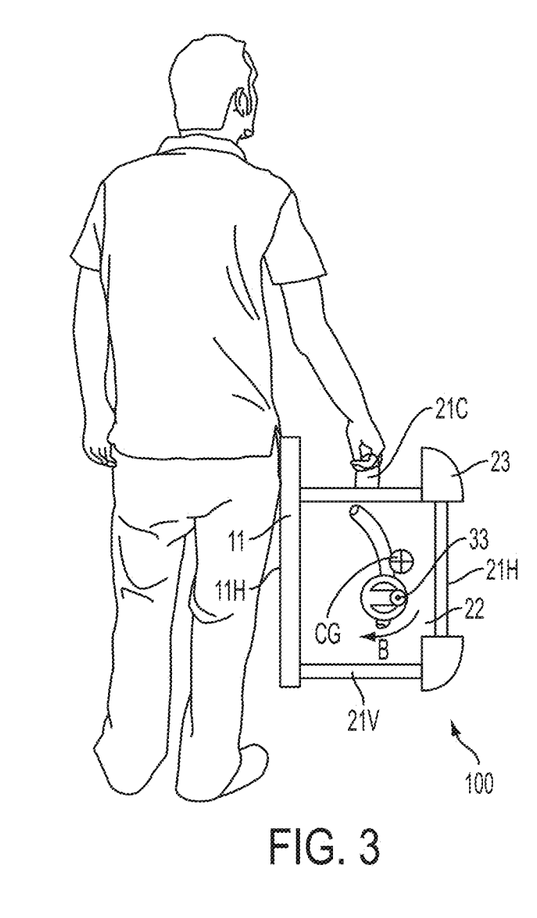
FIG. 3 illustrates the table saw being carried by a user.

Center of gravity CG is preferably disposed between feet assemblies 23 and table assembly 11 and/or outer surface 11S. This would allow a user to stably dispose table saw 100 on its side, so that outer surface 11S and table assembly 11 and/or feet assemblies 23 are resting on the floor or other substantially horizontal surface. Preferably, the center of gravity CG is disposed between feet assemblies 23 and handle 21C so that when a user is holding table saw 100 by handle 21C with the table assembly 11 facing the user (as shown in FIG. 3), the center of gravity CG causes table saw 100 to move towards the user along the direction of arrow B.

Persons skilled in the art will recognize that feet assemblies 23 will provide better impact protection against drops if table saw 100 is dropped. Persons skilled in the art may also recognize that having feet assemblies 23 with curved surfaces 23C could allow a user to rotate table saw 100 from a horizontal position (as shown on the left side of FIG. 1) to a vertical position (as shown on the right side of FIG. 1). The user for example could grab handle 21C or table assembly 11 on the left side and lift table saw 100 while maintaining feet assemblies 23 at the right end of table saw 100 on the floor or support surface. The table saw 100 would then end up in the vertical position of FIG. 1, with an exposed handle 21C.

Referring to FIG. 1, front panel 22 may be disposed on tube(s) 21. Front panel 22 may be made of metal or plastic. Front panel 22 may support an on/off switch 32, a height adjustment crank 33 and a bevel lock crank 34.

Referring to FIGS. 1 and 4-8B, table saw 100 preferably has a front rail assembly 50 attached to a front side of table assembly 11, a rear rail assembly 50 attached to a rear side of table assembly 11, the rail assemblies 50 supporting a fence assembly 60. Persons skilled in the art are referred to U.S. Pat. Nos. 5,722,308 and 6,450,077, which are fully incorporated by reference, for information on the construction of rail assembly 50 and fence assembly 60.

Figure 4:
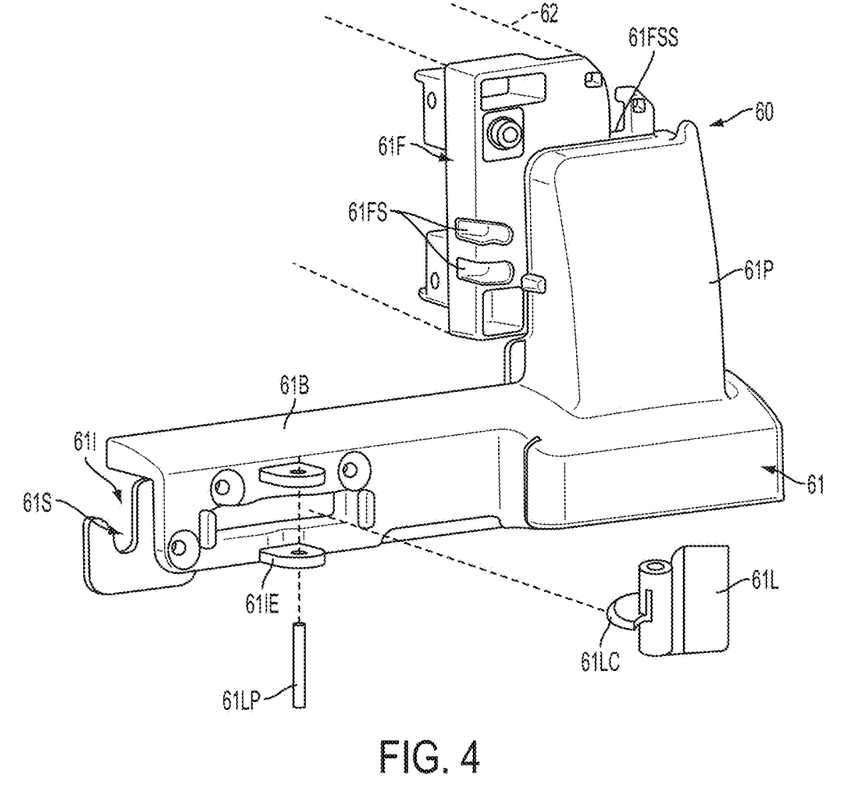
FIG. 4 is a partial view of a fence assembly.
Figure 5:
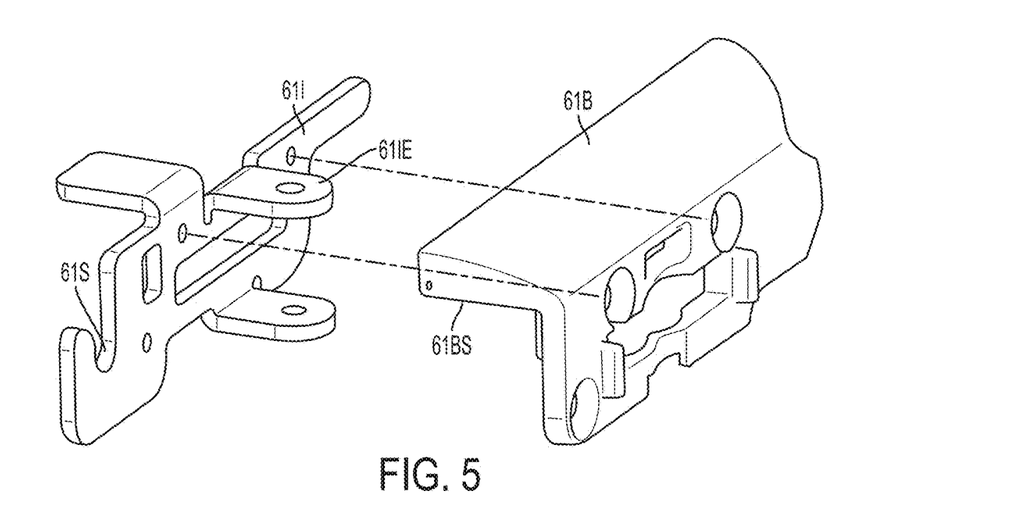
FIG. 5 is an exploded view of components in the fence assembly of FIG. 4.

Each rail assembly 50 preferably includes a fixed rail assembly 51 bolted unto table assembly 11 via a bolt 51B. Rail assembly 51 may include a fixed rail 51R, which is preferably made of extruded aluminum. Fixed rail 51R may have an overmolded portion 51O.

A sliding rail 52 may be slidingly disposed on each fixed rail assembly 51. Sliding rail 52 is preferably made of extruded aluminum. Sliding rail 52 preferably has a slot 52S and a channel 52C disposed adjacent to the slot 52S. Each sliding rail 52 may have a rack 53.

A boss 54 may extend through slot 52S and threadingly engage a nut 54N disposed in channel 52C. This allows a user to move boss 54 along slot 52S. As will be further discussed below fence assembly 60 has a fence beam 62 with a fence plane FP against which a user would place a workpiece, and a mount 61 supporting the fence beam 62. Mount 61 is disposed on boss 54. By adjusting the position of boss 54 relative to slot 52S, the user can thus adjust the position of the fence assembly 60 relative to the sliding rail 52 and/or adjust the parallelism of fence assembly 60 relative to blade 31.

Referring to FIGS. 1 and 4-8B, mount 61 preferably has a body 61B that is disposed on sliding rail 52, a post 61P connected to body 61B, and a fence support 61F connected to the post 61P for supporting a fence beam 62. Preferably body 61B has a horizontal surface 61BS that contacts the upper surface of sliding rail 52, and a slot 61S for receiving boss 54.

Preferably body 61B carries a lock 61L rotatably attached to body 61B. Lock 61L preferably has a cam surface 61LC extending radially from the axis of rotation of lock 61L. One possible means for attachment is to provide body 61B with ears 61IE. Lock 61L can then be disposed between ears 61IE. A pin 61LP can then extend through ears 61IE and lock 61L to maintain the rotational connection between lock 61L and ears 61IE.

Preferably body 61B is made of plastic and carries an insert 61I made of metal, such as steel. Having such insert strengthens body 61B while reducing overall weight. Insert 61I may have slot 61S and/or ears 61IE.

Figure 6A:
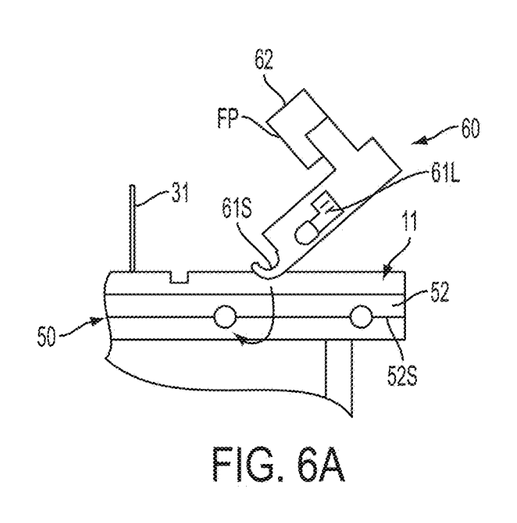
FIG. 6A illustrates the installation and positioning of the fence assembly of FIG. 4.

With such construction, the user can move fence assembly 60 so that slot 61S can receive boss 54 (see FIG. 6A). Once boss 54 is in slot 61S, the user can rotate fence assembly 60 so that mount 61 (and horizontal surface 61BS) is on sliding rail 52. The user can then rotate lock 61L so that cam surface 61LC extends into slot 52S and contacts a wall of sliding rail 52, preferably a wall defining slot 52S. As the cam surface 61LC is rotated, further pressure is placed on such wall, locking the mount 61 unto sliding rail 52.

Figure 6B:
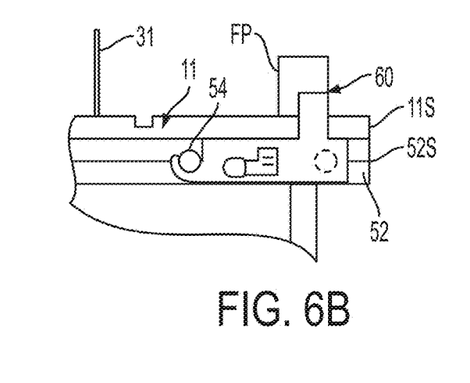
FIGS. 6B-6C show the fence assembly in a first position and a second position respectively.
Figure 6C:
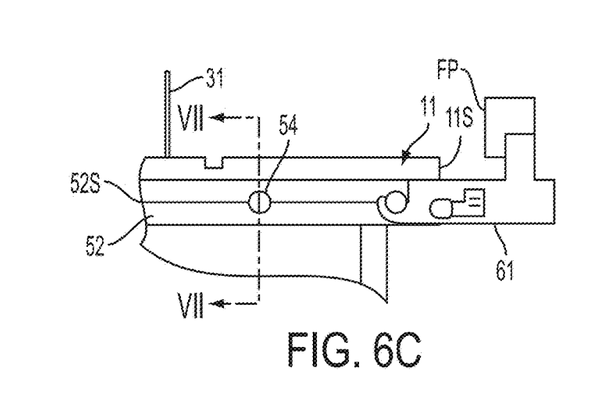
Figure 7:
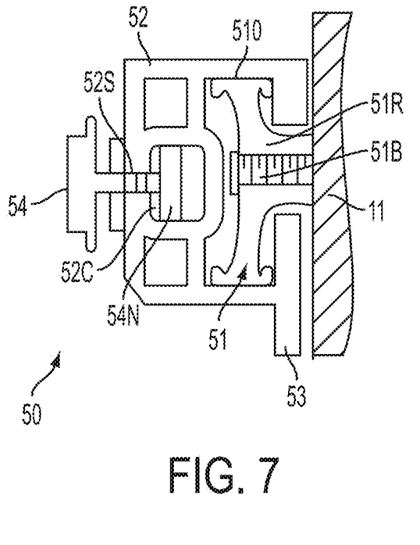
FIG. 7 is a cross-sectional view along line VII-VII of FIG. 6C.

Referring to FIGS. 1 and 6A-6C, it is preferable that two bosses 54 are disposed on sliding rail 52 rightwardly of blade 31. This allows the user to place fence assembly 60 in two positions without having to move bosses 54 and sliding rail 52 relative to fixed rail assembly 51. FIGS. 6B-6C illustrate the first and second positions, respectively. In the first position, mount 61 is connected to the boss 54 closest to blade 31. In such position, fence plane FP is within the ends of fixed rail assembly 51, sliding rail 52 and/or table 11.

In the second position, mount 61 is connected to the boss 54 farthest from blade 31. In such position, fence plane FP is preferably outside of the ends of fixed rail assembly 51, sliding rail 52 and/or table 11. Persons skilled in the art will recognize that this second position is achievable because mount 61 is effectively cantilevered by the connection to boss 54 and horizontal surface 61BS.

Persons skilled in the art shall recognize that it is possible to provide a similar multi-position fence by providing the mount 61 with two slots 61S that can be receive a single boss 54. With such arrangement, the user can take mount 61 off boss 54 so that boss 54 cannot engage the first slot 61S and move mount 61 so that the second slot 61S engages boss 54.

Referring to FIGS. 1, 4 and 8A-8B, fence assembly 60 may include a support member 65 rotatably mounted to fence support 61F. Support member 65 may include an arm 65A pivotally connected to fence support 61F and a support plate 65P for supporting a workpiece W. Arm 65A preferably has a slot 65AS. Fence support 61F has a retaining fastener 61FR extending through slot 65AS, capturing arm 65A.

Figure 8A:
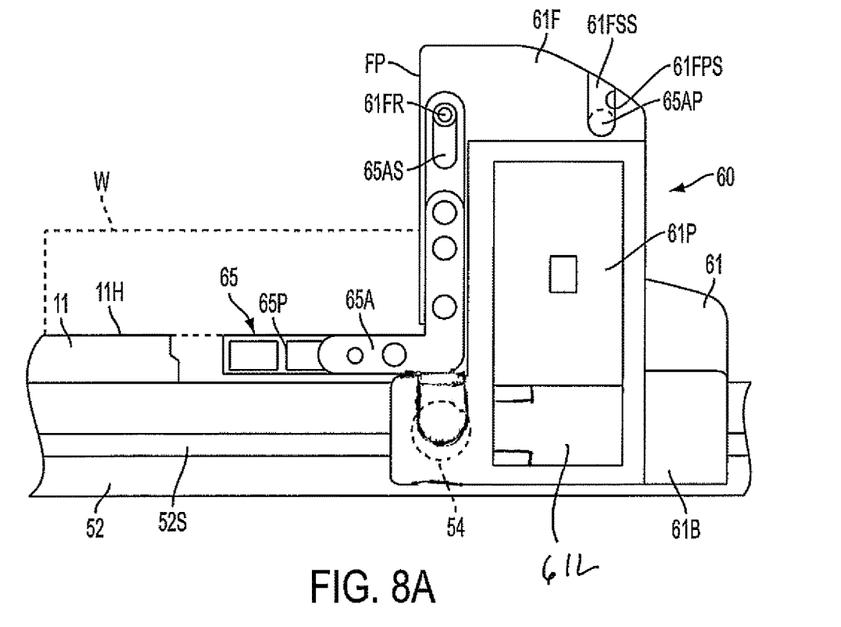
FIG. 8A is a side view of a support member of the fence assembly in a first position.
Figure 8B:
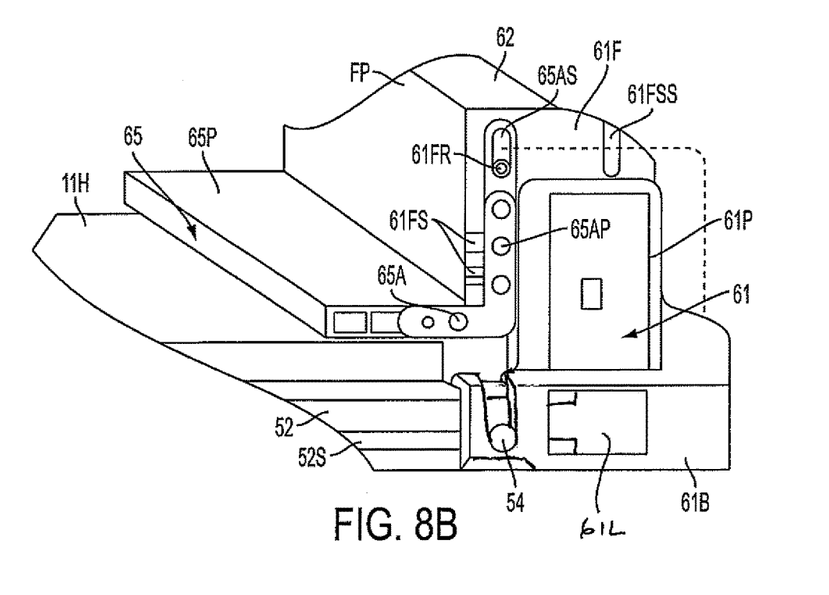
FIG. 8B is a perspective view of the support member in a second position and a third position shown in solid and broken lines, respectively.

Such arrangement allows aim 65A (and thus support plate 65P) can be moved along slot 65AS to be moved between several positions. In a first position, support plate 65P can support a workpiece W when the fence assembly 60 is moved beyond table assembly 11 (as shown in FIG. 8A). Persons skilled in the art will recognize that support plate 65P is preferably substantially coplanar with surface 11H of table assembly 11. Alternatively, arm 65A (and thus support plate 65P) can be moved upwardly. This allows support plate 65SP to be placed on table assembly 11, as shown in FIG. 8B.

Preferably fence support 61F have slots 61FS that can receive a pin 65AP extending from arm 65A towards fence support 61F. Such pin/slot combination will allow the user to easily find the different positions of arm 65A (and thus support plate 65P).

Persons skilled in the art will recognize that arm 65A can be rotated about retaining fastener 61FR to a third position (shown in solid lines in FIG. 1 and broken lines in FIG. 8B) where support plate 65SP is behind fence plane FP, and thus does not interfere with a cutting operation. Preferably fence support 61F will have a storage slot 61FSS that receives pin 65AP when arm 65A is rotated towards the third position. A spring 61FPS may be disposed within storage slot 61FSS for capturing and retaining pin 65AP (and thus arm 65A).

Persons skilled in the art may recognize other additions or alternatives to the means disclosed herein. However, all these additions and/or alterations are considered to be equivalents of the present invention.

We claim:

1. A table saw comprising:
   a base assembly;
   a table assembly supported by the base assembly, the table assembly defining a workpiece support plane;
   a saw assembly supported by at least one of the table assembly and the base assembly, the saw assembly including a saw blade extending through the table assembly; and
   a fence assembly disposed on the assembly, the fence assembly comprising a fixed rail connected to the table assembly, a sliding rail slidingly connected to the fixed rail, and a fence attached to the sliding rail,
   wherein the fence comprises a fence mount disposable on the sliding rail, a fence beam connected to the fence mount, the fence beam having a workpiece support surface, and a lock mechanism disposed on the fence mount for locking the fence mount on the sliding rail, wherein the fence is disposable in a first position where the fence beam is between first and second ends of the sliding rail, the workpiece support surface being parallel to the saw blade while the saw blade is perpendicular to the table assembly, and a second position where an entire of the fence beam is not between the first and second ends of the sliding rail, the workpiece support surface being parallel to the saw blade while the saw blade is perpendicular to the table assembly, where the fence is disposed on the sliding rail in both the first and second positions.

2. The table saw of claim 1, wherein the lock mechanism comprises a cam surface that engages a slot in the sliding rail.

3. The table saw of claim 1, wherein the fence further comprises a movable support plate mounted to the fence mount, the support plate being movable between a first position where the support plate is between the saw blade and the fence beam and where the support plate is substantially coplanar with the workpiece support plane, and a second position where the support plate is not between the saw blade and the fence beam.

4. The table saw of claim 3, wherein the support plate is movable to a third position where the support plate is between the saw blade and the fence beam and where the support plate is disposed above the workpiece support plane.

* * * * *